US012761318B2

(12) United States Patent
Heo

(10) Patent No.: US 12,761,318 B2

(45) Date of Patent: Oct. 13, 2026

(54) METHOD OF REMOVING GHOST TARGET DUE TO VEHICLE RADAR MULTI-REFLECTION SIGNAL, AND SYSTEM FOR REMOVING GHOST TARGET

(71) Applicant: HL KLEMOVE CORP., Incheon (KR)

(72) Inventor: Oh Cheol Heo, Gyeonggi-do (KR)

(73) Assignee: HL KLEMOVE CORP., Incheon (KR)

(*) Notice: Subject to any disclaimer, the term of this patent is extended or adjusted under 35 U.S.C. 154(b) by 302 days.

(21) Appl. No.: 18/418,067

(22) Filed: Jan. 19, 2024

(65) Prior Publication Data

US 2025/0020773 A1 Jan. 16, 2025

(30) Foreign Application Priority Data

Jan. 20, 2023 (KR) ........................ 10-2023-0009022

(51) Int. Cl.
*G01S 7/41* (2006.01)
*G01S 13/931* (2020.01)

(52) U.S. Cl.
CPC ............ *G01S 7/414* (2013.01); *G01S 13/931* (2013.01); *G01S 2013/93272* (2020.01)

(58) Field of Classification Search
CPC ................... G01S 7/414; G01S 13/931; G01S 2013/93272; G01S 13/20; G01S 13/42; G01S 13/48; G05D 2111/30; B60W 40/02; B60W 2420/408
See application file for complete search history.

(56) References Cited

U.S. PATENT DOCUMENTS

| | | | | |
|---|---|---|---|---|
| 5,321,406 | A * | 6/1994 | Bishop | G01S 13/933 342/37 |
| 6,323,802 | B1 | 11/2001 | Tokoro | |
| 6,693,583 | B2 | 2/2004 | Tamatsu et al. | |
| 2018/0341012 | A1 | 11/2018 | Takada | |
| 2021/0364600 | A1 * | 11/2021 | Kang | G01S 7/414 |
| 2023/0166736 | A1 * | 6/2023 | Yoo | B60W 40/06 701/1 |
| 2023/0243960 | A1 * | 8/2023 | Wang | G01S 13/931 342/70 |
| 2024/0053467 | A1 * | 2/2024 | Dvorecki | G01S 13/931 |

FOREIGN PATENT DOCUMENTS

| | | |
|---|---|---|
| JP | 2000-147115 | 5/2000 |
| JP | 3770189 | 4/2006 |
| JP | 2018-200173 | 12/2018 |

* cited by examiner

*Primary Examiner* — Brady W Frazier
*Assistant Examiner* — Ismaaeel A. Siddiquee
(74) *Attorney, Agent, or Firm* — WOMBLE BOND DICKINSON (US) LLP

(57) ABSTRACT

Provided is a method of removing a ghost target due to a vehicle radar multi-reflection signal. More specifically, the method includes determining the presence or absence of an occluded target, and when a condition is satisfied, determining the target as a ghost target due to a multi-reflection signal and removing the target.

2 Claims, 5 Drawing Sheets

METHOD OF REMOVING GHOST TARGET DUE TO VEHICLE RADAR MULTI-REFLECTION SIGNAL, AND SYSTEM FOR REMOVING GHOST TARGET

CROSS-REFERENCE TO RELATED APPLICATION

This application is based on and claims priority under 35 U.S.C. § 119 to Korean Patent Application No. 10-2023-0009022, filed on Jan. 20, 2023, in the Korean Intellectual Property Office, the disclosure of which is incorporated by reference herein in its entirety.

BACKGROUND

1. Field

The disclosure relates to a method of removing a ghost target due to a vehicle radar multi-reflection signal, and a system for removing the ghost target, and more particularly, to a method of removing a ghost target due to a vehicle radar multi-reflection signal, and a system for removing the ghost target, in which the presence or absence of an occluded target is determined, and when certain conditions are met, the target is determined as a ghost target due to a multi-reflection signal and is removed.

2. Description of the Related Art

As autonomous vehicle technology has recently developed, various methods for recognizing and avoiding a target while driving on a road have been developed.

However, various situations may occur during a driving process, and when a ghost target due to a multi-reflection signal occurs in a vehicle radar for detecting a target, the ghost target may be recognized and thus, driving performance may deteriorate or an accident may occur.

FIGS. 1 and 2 respectively illustrate a multi-reflection signal from a stationary structure and a multi-reflection signal from a moving object. In FIGS. 1 and 2, L1 indicates a reflection signal path (direct path), and L2 indicates a multi-reflection signal path (multi path).

As shown in FIG. 1, in a method of recognizing a ghost target, according to the related art, a target W2 generated by reflection, on a guardrail or the like, of a signal related to a target W1 located at the rear of a vehicle is recognized as a ghost target. This may be described as, after recognizing the guardrail, recognizing the target W2 located beyond the guard rail as a ghost target by recognizing a continuous stationary object signal.

However, this method has a limitation in that a ghost target cannot be recognized in the presence of a multi-reflection signal from nearby vehicles.

For example, as shown in FIG. 2, in the presence of a first target and a second target, when a signal occurring in the first target is reflected by the second target, and a third target, which is a ghost target, is generated, the third target cannot be recognized as a ghost target.

Thus, a means for resolving the above drawback must be developed.

SUMMARY

Provided are a method of removing a ghost target due to a vehicle radar multi-reflection signal and a system for removing the ghost target, in which ghost target recognition performance is improved by adding a multi-reflection signal recognition method by a moving object to the related-art ghost target (multi-reflection signal due to a stationary structure) recognition method.

Additional aspects will be set forth in part in the description which follows and, in part, will be apparent from the description, or may be learned by practice of the presented embodiments of the disclosure.

According to an aspect of the inventive concept, provided is a method of removing a ghost target due to a vehicle radar multi-reflection signal, the method including the steps of (First step) recognizing a presence of a first target, a second target, and a third target, which are located at a rear of a vehicle on which a system and a sensor are mounted, the system having a method of removing a ghost target due to a vehicle radar multi-reflection signal, (Second step) setting an occlusion region of the second target, (Third step) recognizing a target present within the occlusion region of the second target as a third target, (Fourth step) comparing information about the first target with information about the third target, and (Fifth step) determining whether the third target is a ghost target.

The second step may include setting, to the occlusion region of the second target, an area between two outermost external lines from among straight lines passing through a reference point, at which the sensor provided in the vehicle is positioned, and corner points of a planar geometry of the second target.

In the fourth step, information to be compared may include at least one of a longitudinal position of the first target and a longitudinal position of the third target, a transverse position of the first target and a transverse position of the third target, and estimated speeds of the first target and the third target.

The longitudinal position of the first target and the longitudinal position of the third target may have a position of the sensor mounted on the vehicle as a longitudinal reference point.

The longitudinal position of the first target and the transverse position of the third target may be based on a reflective surface, and the reflective surface may include a transverse surface located closest to the sensor mounted on the vehicle from among transverse surfaces having shapes constituting a planar geometry of the second target.

In the fifth step, when a condition is satisfied, the third target may be determined as a ghost target, and the condition may be that the longitudinal position of the first target and the longitudinal position of the third target are similar to each other.

In the fifth step, when a condition is satisfied, the third target may be determined as a ghost target, and the condition may be that the transverse position of the first target and the transverse position of the third target are similar to each other.

In the fifth step, when a condition is satisfied, the third target may be determined as a ghost target, and the condition may be that an estimated speed of the first target and an estimated speed of the third target are similar to each other.

According to an aspect of the inventive concept, provided is a system for removing a ghost target due to a vehicle radar multi-reflection signal, wherein the system includes an algorithm for recognizing a first target and a second target, which are located at a rear of a vehicle on which the system is mounted, setting an occlusion region of the second target, and comparing information about a third target present within the occlusion region of the second target with information about the first target and determining whether the third target is a ghost target.

The occlusion region of the second target may include an area between two outermost external lines from among straight lines passing through a reference point at which a sensor mounted in a vehicle is positioned and corner points of a planar geometry of the second target.

Information to be compared may include at least one of a longitudinal position of the first target and a longitudinal position of the third target, a transverse position of the first target and a transverse position of the third target, and estimated speeds of the first target and the third target.

The longitudinal position of the first target and the longitudinal position of the third target may have a position of a sensor mounted on a vehicle as a longitudinal reference point.

The longitudinal position of the first target and the transverse position of the third target may be based on a reflective surface, and the reflective surface may include a transverse surface located closest to a sensor mounted on a vehicle from among transverse surfaces having shapes constituting a planar geometry of the second target.

In the fifth step, when a condition is satisfied, the third target may be determined as a ghost target, and the condition may be that the longitudinal position of the first target and the longitudinal position of the third target are similar to each other.

In the fifth step, when a condition is satisfied, the third target may be determined as a ghost target, and the condition may be that the transverse position of the first target and the transverse position of the third target are similar to each other.

In the fifth step, when a condition is satisfied, the third target may be determined as a ghost target, and the condition may be that the estimated speed of the first target and the estimated speed of the third target are similar to each other.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
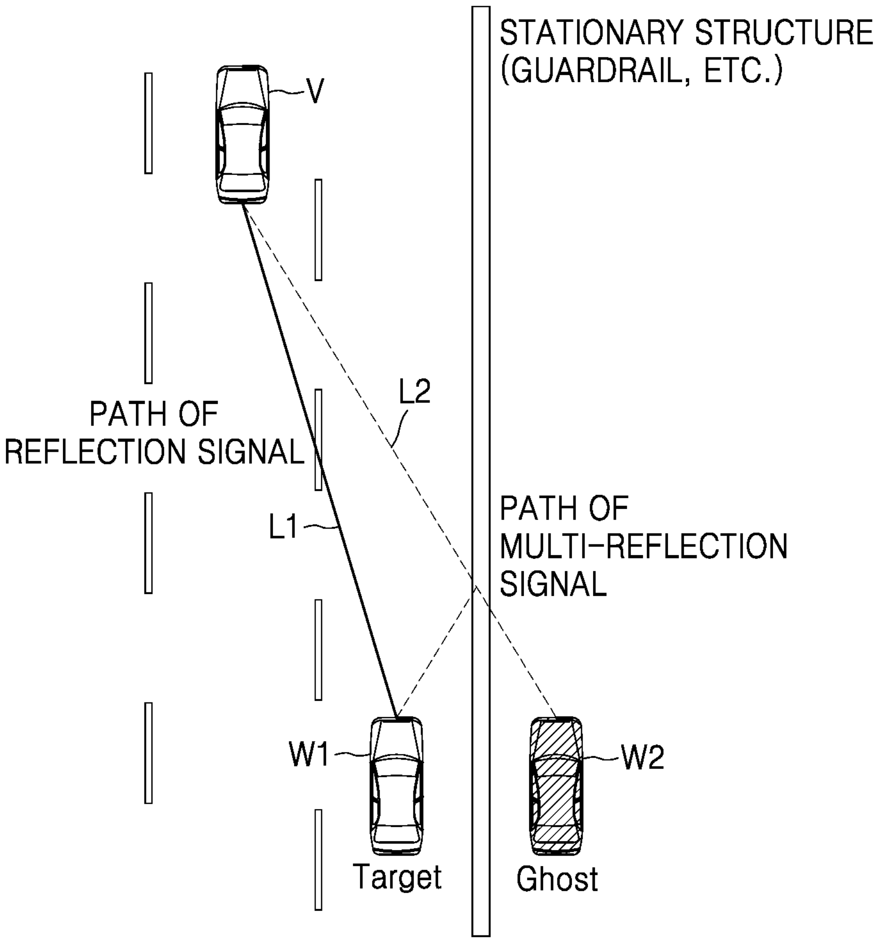
FIGS. 1 and 2 are diagrams respectively illustrating a multi-reflection signal from a stationary structure and a multi-reflection signal from a moving object.
Figure 2:
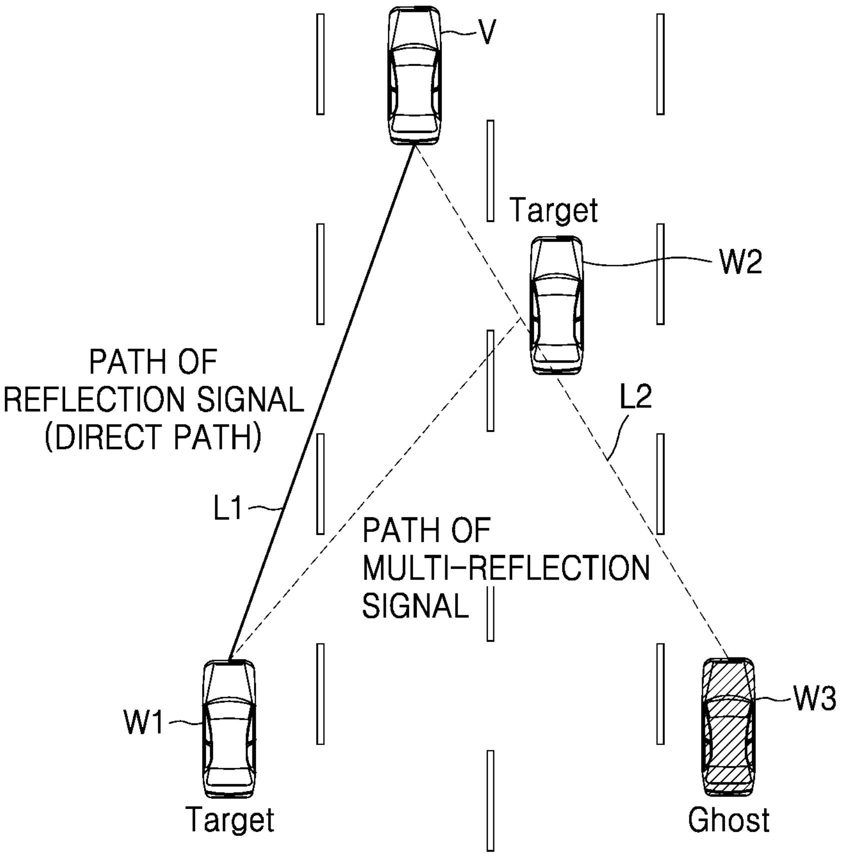

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of", when preceding a list of elements, modify the entire list of elements and do not modify the individual elements of the list.

The present specification clarifies the scope of rights of the disclosure, explains the principles of the disclosure, and discloses embodiments so that those skilled in the art can practice the disclosure. The disclosed embodiments may be embodied in various forms.

Expressions that may be used in various embodiments of the disclosure, such as "includes" or "may include", refer to the existence of the disclosed function, operation or component, and do not limit one or more additional functions, operations or components. In addition, in various embodiments of the disclosure, it should be construed that terms such as "comprise", "include", or "have" are to designate the presence of features, numbers, steps, operations, elements, components, or a combination thereof, described in the specification, and not to exclude in advance the possibilities of presence or addition of one or more other features, numbers, steps, operations, elements, components, or a combination thereof.

When it is referred that an element is "connected" or "coupled" to other elements, the element may be directly connected or coupled to the other elements, but another novel element may be present between the element and the other elements. On the other hand, when an element is referred to be "directly connected" or "directly coupled" to other elements, it should be construed that there is no other novel element between the element and the other elements.

While such terms as "first", "second", etc., may be used to describe various components, such components must not be limited to the above terms. The above terms are used only to distinguish one element from another element.

A method of removing a ghost target due to a vehicle radar multi-reflection signal, according to an embodiment of the disclosure, may be mounted in a system (main system) in a form of an algorithm, and this system may be mounted on a vehicle (mounting vehicle V) and used. In other words, in the description below, the mounting vehicle V may be referred to as a vehicle on which a system is mounted, the system having mounted thereon a method of removing a ghost target due to a vehicle radar multi-reflection signal according to an embodiment.

The mounting vehicle V may have a sensor S on a rear surface thereof. This sensor S may be any sensor such as an optical sensor. A position of the sensor S may be referred to as a reference point.

Figure 3:
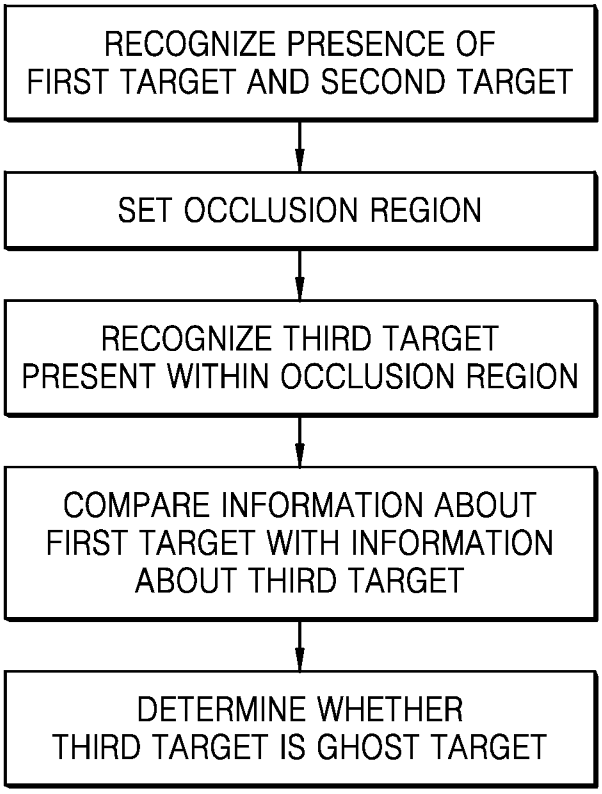
FIG. 3 is a flowchart of a method of removing a ghost target due to a vehicle radar multi-reflection signal, according to an embodiment of the disclosure.
Figure 4:
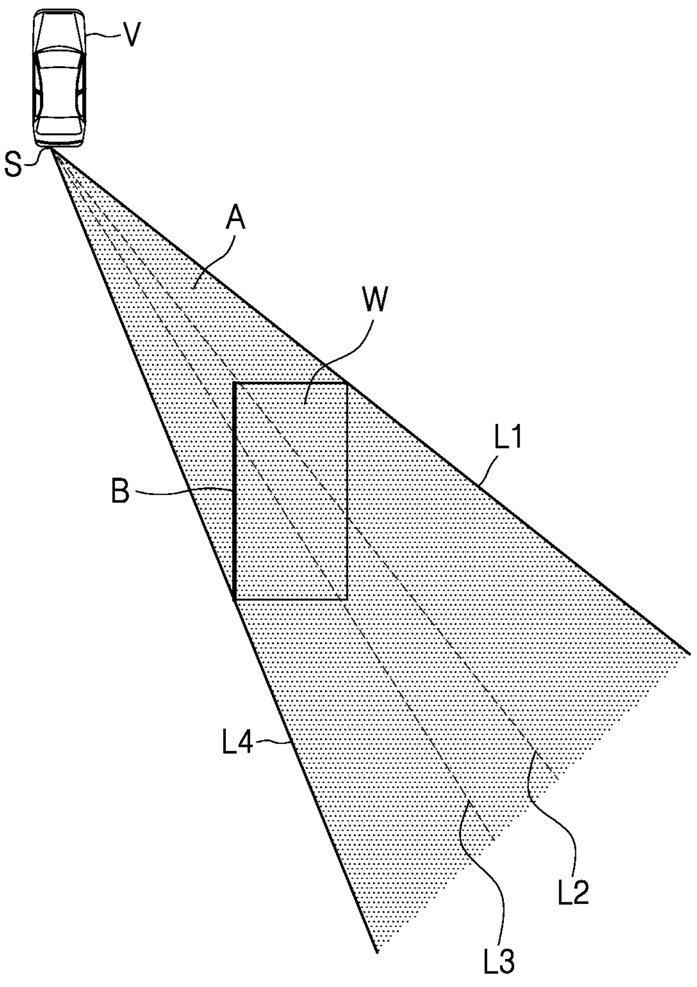
FIG. 4 is a diagram illustrating an occlusion region of a second target of a method of removing a ghost target due to a vehicle radar multi-reflection signal, according to an embodiment of the disclosure.
Figure 5:
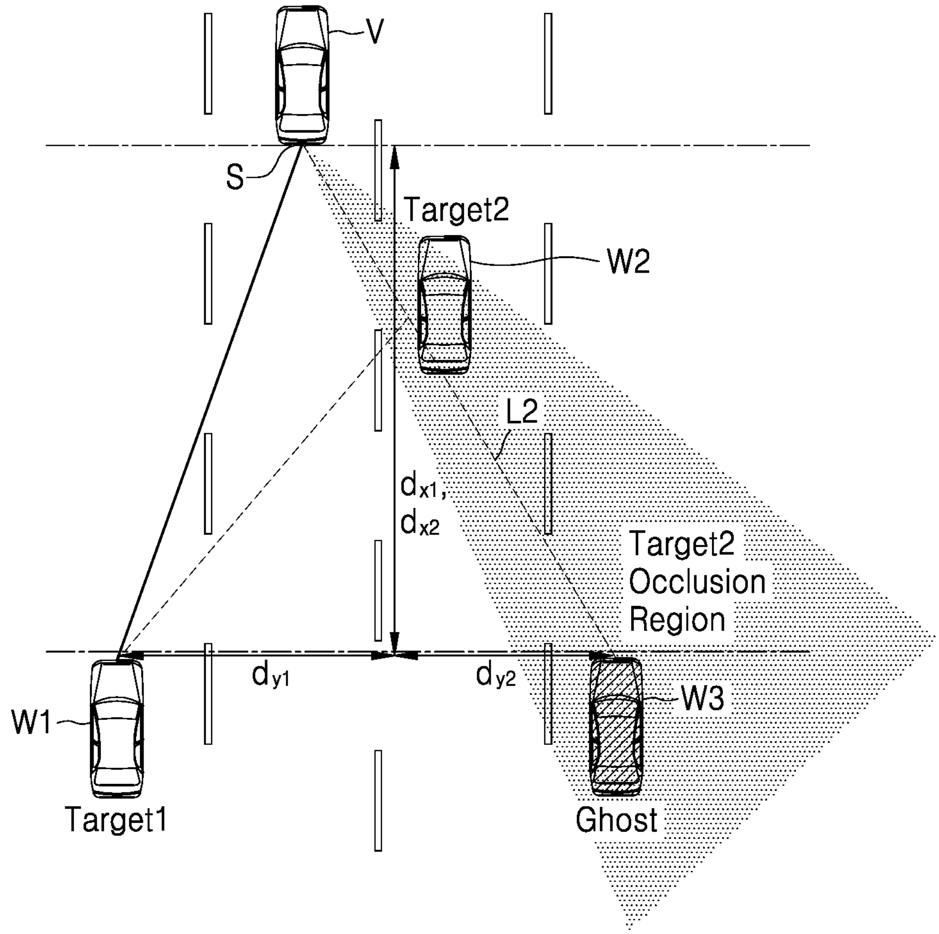
FIG. 5 is a diagram for describing a method of removing a ghost target due to a vehicle radar multi-reflection signal, according to an embodiment of the disclosure.

FIG. 3 is a flowchart of a method of removing a ghost target due to a vehicle radar multi-reflection signal, according to an embodiment. FIG. 4 is a diagram illustrating an occlusion region of a second target W2 of a method of removing a ghost target due to a vehicle radar multi-reflection signal, according to an embodiment, and FIG. 5 is a diagram for describing a method of removing a ghost target due to a vehicle radar multi-reflection signal according to an embodiment.

The method of removing a ghost target due to a vehicle radar multi-reflection signal, according to an embodiment, may have steps described below.

(First Step) Recognizing the Presence of a First Target W1 and a Second Target W2

The first target W1 and the second target W2 may be recognized by a sensor S provided in the mounting vehicle V. The first target W1 and the second target W2 may be vehicles located at the rear of the mounting vehicle V and may be vehicles approaching in a direction in which the mounting vehicle V is located.

(Second Step) Setting an Occlusion Region A of the Second Target W2

FIG. 4 is a diagram for describing the occlusion region A of the second target W2.

The occlusion region A of the second target W2 may be set in an order described below.

Because the second target W2 is a vehicle, a planar geometry of the second target W2 may have an approximately quadrangular shape. Accordingly, the number of corner points of the planar geometry of the second target W2 may be four. When straight lines passing through the reference point, which is the position of the sensor S, and the corner points of the planar geometry of the second target W2 are set, four straight lines may be generated. The four straight lines are diagonal lines that cross at the reference point. Inevitably, two specific straight lines L2 and L3 (internal lines) from among the four straight lines may be positioned within an area S including the other two specific straight lines L1 and L4 (external lines). A boundary of the occlusion region A may be set by the external lines L3 and L4. In other words, an area between the external lines may become the occlusion region A of the second target W2.

However, this is only an example, and the planar geometry of the second target W2 may not be an exact quadrangle. In this case, from among a plurality of straight lines passing through the planar geometry of the second target W2 and the reference point, two straight lines positioned on the outermost side may be set to external lines, and a space between the two external lines may be set to the occlusion region A of the second target W2.

(Third Step) Recognizing a Third Target W3 Present within the Occlusion Region A of the Second Target W2

A target present within the occlusion region A of the second target W2 may be set to the third target W3.

The third target W3 may be recognized by the sensor S provided in the mounting vehicle V.

Meanwhile, when it is referred that the third target W3 is present within the occlusion region A of the second target W2, it includes not only a case in which the third target W3 is positioned 100% within the occlusion region A of the second target W2, but also a case in which the third target W3 is positioned within a certain percent (e.g., 80%) or more of the occlusion region A of the second target W2.

For example, when the first target W1 is a large vehicle (bus, truck, etc.), in some cases, the first target W1 may escape from the occlusion region. Accordingly, according to an embodiment, a degree of inclusion in the occlusion region may be tuned, or a margin may be set in a range of the occlusion region. For example, when the degree of inclusion in the occlusion region is tuned, a range that overlaps the area may be differently applied, depending on a size and location (distance from a host vehicle) of the target. Further, an algorithm for calculating a degree of inclusion in the occlusion region may be mounted.

(Fourth Step) Comparing Information on the First Target W1 with Information on the Third Target W3.

The first target W1 recognized in the first step and information on the third target W3 present within the occlusion region A of the second target W2 recognized in the third step may be compared.

In this step, the information to be compared is at least one of the items below.

1) Vertical position ($d_x$): a longitudinal position (vertical position) of the first target W1 and a longitudinal position of the third target W3 are compared to each other. The longitudinal direction is a direction in which the mounting vehicle V travels, and may refer to a front-to-back direction. A reference of comparison of the longitudinal positions of the first target W1 and the third target W3 is a reference point. In other words, the longitudinal position of the reference point may be set to a longitudinal origin $d_{x0}$, and a first vertical position $d_{x1}$, which is a distance between the longitudinal origin and the vertical position of the first target, and a second vertical position $d_{x2}$, which is a distance between the longitudinal origin and the vertical position of the third target W3, may be compared to each other.

2) Transverse position ($d_y$): A transverse position (horizontal position) of the first target W1 and a transverse position of the third target W3 are compared to each other. The transverse direction is a direction perpendicular to a direction in which the mounting vehicle V travels, and may mean the left and right direction. A reference for comparison of the transverse positions of the first target W1 and the third target W3 is a reflective surface B. The reflective surface B is a transverse surface located at a point closest to the reference point from among a quadrangle-shaped transverse surfaces (surfaces extending in the longitudinal direction) constituting the planar geometry of the second target W2. In other words, in a shape constituting the planar geometry of the second target W2, a point located closest to the reference point in the transverse direction may be set to a transverse reference point, and a line extending from the transverse reference point in the longitudinal direction may be referred to as the reflective surface B. In this way, the transverse position of the reflective surface B is set to a transverse origin $d_{y0}$, and a first transverse position $d_{y1}$, which is a size of the transverse position of the first target W1 with respect to the transverse origin $d_{y0}$, and a second transverse position, which is a size of the transverse position of the third target W3 with respect to the transverse origin $d_{y0}$, may be compared to each other.

3) Estimated speed information

Estimated speeds of the first target W1 and the third target W3 may be compared to each other. The estimated speed may be measured by using a speed sensor or the like mounted on the mounting vehicle V.

(Fifth Step) Determining Whether the Third Target W3 is a Ghost Target

Determination may be made as to whether the third target W3 is a ghost target based on the information obtained in the third step.

According to an embodiment, when it is determined that the longitudinal position $d_{x1}$ of the first target W1 and the longitudinal position $d_{x2}$ of the third target W3 are similar, the transverse position $d_{y1}$ of the first target W1 and the transverse position $d_{y2}$ of the third target W3 are similar, and the estimated speed v1 of the first target W1 and the estimated speed v2 of the third target W3 are similar, the third target W3 may be determined as a ghost target.

In the condition above, determination of similarity between each may include not only 100% matching, but also indicating similar values within a certain size range (90%). For example, depending on the size and position of each of the targets W1 and W3, determination criteria on similarity may vary, and an algorithm for determining the similarity may be mounted.

This is described below, with reference to FIG. 5.

The third target W3 shown in FIG. 5 is first positioned within the occlusion region A of the second target W2. Accordingly, the first condition is satisfied.

Further, in the first target W1 and the second target W2, a size of the first longitudinal position $d_{x1}$ is similar to a size of the second longitudinal position $d_{x2}$, a size of the first transverse position $d_{y1}$ is similar to a size of the second transverse position $d_{y2}$, and pieces of estimated speed information are similar. Thus, the third target W3 satisfies the second condition.

As described above, because the third target W3 satisfies the first condition and the second condition, the third target W3 may be determined as a ghost target of the first target W1 and removed.

In other words, in a method of removing a ghost target due to a vehicle radar multi-reflection signal, according to an embodiment, the presence or absence of a ghost target may be determined by determining whether a similar target in terms of location and speed information is present.

In a method of removing a ghost target due to a vehicle radar multi-reflection signal, according to an embodiment, a method of recognizing a multi-reflection signal from a moving object is added to the related-art method of recognizing a ghost target (multi-reflection signal from a stationary structure). Therefore, ghost target recognition performance may be improved, and thus, detection of a ghost target due to a vehicle radar may be suppressed.

Further, a system for removing a ghost target, according to an embodiment is a system for removing a ghost target, in which the ghost target due to a vehicle radar multi-reflection signal is removed. In the system for removing the ghost target, the above-described method of manufacturing a ghost target due to a vehicle radar multi-reflection signal may be built as an algorithm. Details of the algorithm is similar to that described above, and redundant descriptions thereof are omitted.

In the method of removing a ghost target due to a vehicle radar multi-reflection signal, and a system for removing the ghost target, according to an embodiment, compared to the related-art method of recognizing a ghost target (multi-reflection signal from a stationary structure), a method of recognizing a multi-reflection signal from a moving object is added to thereby improve ghost target recognition performance, so as to suppress a vehicle radar from detecting the ghost target.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of removing a ghost target due to a vehicle radar multi-reflection signal, the method comprising the steps of:

(First step) recognizing a presence of a first target and a second target, which are located at a rear of a vehicle on which a system and a sensor are mounted, the system having a method of removing the ghost target due to a vehicle radar multi-reflection signal;

(Second step) setting an occlusion region of the second target;

(Third step) recognizing a target present within the occlusion region of the second target as a third target;

(Fourth step) comparing information about the first target with information about the third target; and (Fifth step) determining whether the third target is the ghost target, wherein the second step comprises setting, to the occlusion region of the second target, an area between two outermost external lines from among straight lines passing through a reference point, at which the sensor provided in the vehicle is positioned, and corner points of a planar geometry of the second target, wherein, in the fourth step, information to be compared comprises at least one of:

a longitudinal position of the first target and a longitudinal position of the third target;

a transverse position of the first target and a transverse position of the third target; and estimated speeds of the first target and the third target, wherein the longitudinal position of the first target and the longitudinal position of the third target have a position of the sensor mounted on the vehicle as a longitudinal reference point, wherein the longitudinal position of the first target and the transverse position of the third target are based on a reflective surface, and the reflective surface comprises a transverse surface located closest to the sensor mounted on the vehicle from among transverse surfaces having shapes constituting a planar geometry of the second target, wherein, in the fifth step, based on a condition which is satisfied, the third target is determined as the ghost target, and the condition is that the longitudinal position of the first target and the longitudinal position of the third target are similar to each other, the transverse position of the first target and the transverse position of the third target are similar to each other, and the estimated speed of the first target and the estimated speed of the third target are similar to each other, wherein the third target is determined as the ghost target generated by a multi-reflection signal, wherein the method further comprises removing the third target determined as the ghost target generated by a multi-reflection signal.

2. A system for removing a ghost target due to a vehicle radar multi-reflection signal, wherein the system comprises an algorithm for:

recognizing a first target and a second target, which are located at a rear of a vehicle on which the system is mounted;

setting an occlusion region of the second target; and comparing information about a third target present within the occlusion region of the second target with information about the first target and determining whether the third target is the ghost target, wherein the occlusion region of the second target comprises an area between two outermost external lines from among straight lines passing through a reference point, at which a sensor mounted in the vehicle is positioned, and corner points of a planar geometry of the second target, wherein information to be compared comprises at least one of:

a longitudinal position of the first target and a longitudinal position of the third target;

a transverse position of the first target and a transverse position of the third target; and estimated speeds of the first target and the third target, wherein the longitudinal position of the first target and the longitudinal position of the third target have a position of the sensor mounted on the vehicle as a longitudinal reference point, wherein the longitudinal position of the first target and the transverse position of the third target are based on a reflective surface, and the reflective surface comprises a transverse surface located closest to the sensor mounted on the vehicle from among transverse surfaces having shapes constituting a planar geometry of the second target, wherein determining whether the third target is the ghost target comprises determining the third target as the ghost target based on a condition which is satisfied, and the condition is that the longitudinal position of the first target and the longitudinal position of the third target are similar to each other, the transverse position of the first target and the transverse position of the third target are similar to each other, and the estimated speed of the first target and the estimated speed of the third target are similar to each other wherein the algorithm further comprises removing the third target determined as the ghost target generated by a multi-reflection signal.

* * * * *